UNITED STATES PATENT OFFICE.

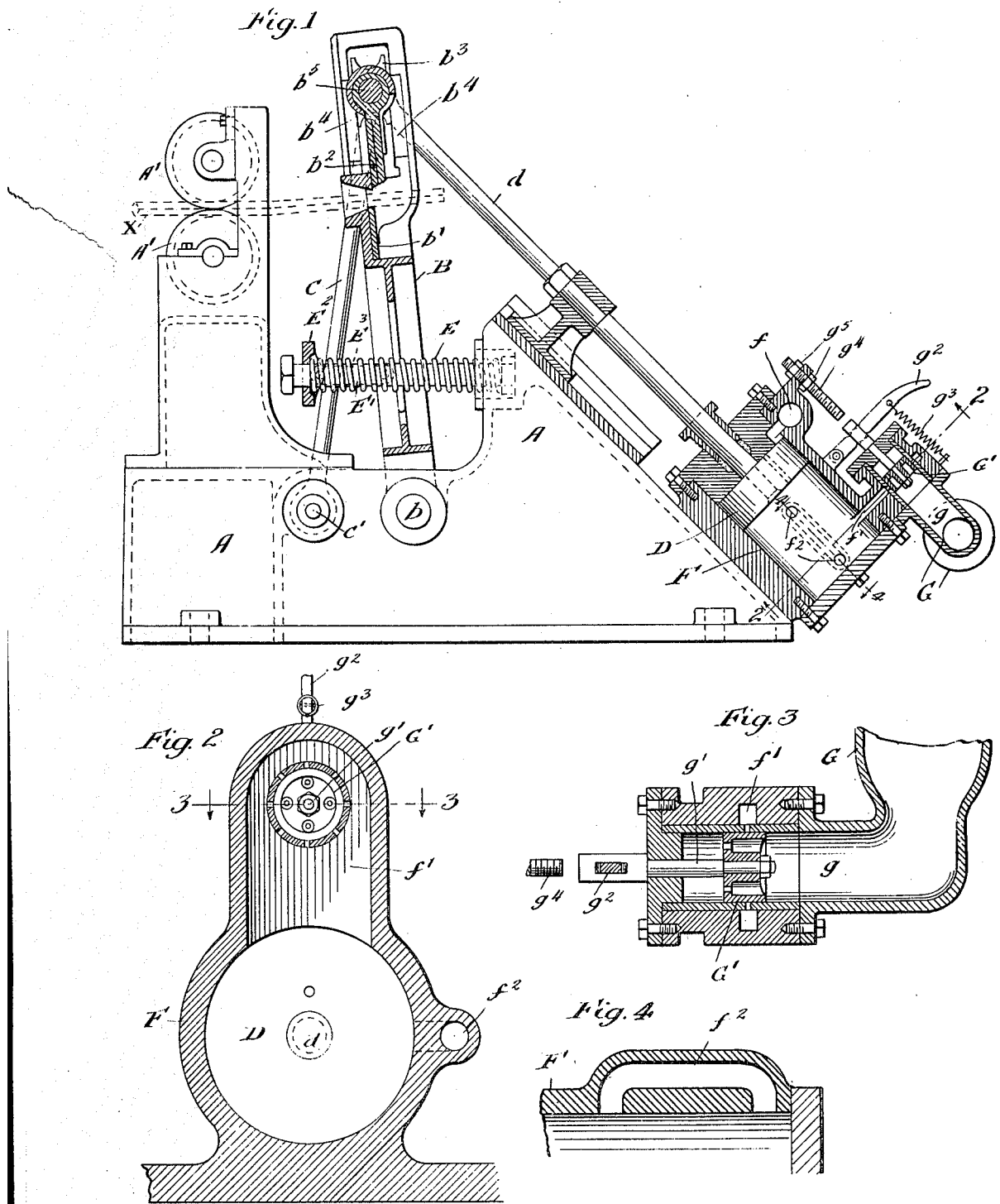

WILLIAM H. STANTON, OF CHICAGO, ILLINOIS.

FLYING SHEARS FOR ROD OR BAR MILLS.

No. 871,532.        Specification of Letters Patent.        Patented Nov. 19, 1907.

Application filed September 3, 1907. Serial No. 391,048.

*To all whom it may concern:*

Be it known that I, WILLIAM H. STANTON, a citizen of the United States, residing in Chicago, in the county of Cook and State of Illinois, have invented a new and useful Improvement in Flying Shears for Rod or Bar Mills, of which the following is a specification.

My invention relates to improvements in flying shears for rod or bar mills.

The object of my invention is to provide a flying shear for cutting rods or bars to lengths in rod or bar mills, which will be of a strong, simple, efficient and durable construction, and operate with certainty and uniformity and smoothly, or without hammering.

My invention consists, in connection with the feed rolls by which the rod or bar to be cut is fed or continuously advanced, the swinging frame or arm upon which the reciprocating and non-reciprocating knives or cutters of the shear are mounted, a spring for returning the swinging shear frame to position after each stroke of the shear and a cylinder and piston for operating the shear, of an exhaust or release valve for setting the shear in operation having a hand lever for positively moving said valve to open the exhaust, an adjustable stop for limiting the opening movement of the valve, and a spring for automatically and quickly returning the valve to position to close the exhaust, the cylinder being provided with a by-pass to cause the steam or other operative fluid to quickly cushion and arrest the stroke of the piston the instant the shear severs the rod or bar, so as to prevent hammering or pounding action, and so as to enable the spring which acts against the swinging frame of the shear to restore it to position, the by-pass causing the steam or operative-fluid pressure to balance on both sides of the piston, and thus enabling the shear frame spring to return such frame into position for the next stroke. My invention also consists in the novel construction of parts and devices and in the novel combinations of parts and devices herein shown and described.

In the accompaying drawing, forming a part of this specification, Figure 1 is a side elevation partly in vertical section, of a flying shear embodying my invention; Fig. 2 a cross section on line 2—2 of Fig. 1; Fig. 3 is a section on line 3—3 of Fig. 2, and Fig. 4 is a partial section on line 4—4 of Fig. 1.

In the drawing A represents the bed or main frame of the machine, and $A^1$ the continuously driven feed rolls of the rod or bar mill, by which the rod or bar X is continuously fed or advanced to the flying shear by which it is cut into lengths.

B is the movable or swinging frame of the flying shear pivoted to the main frame at $b$, and upon which the knives or cutters $b^1$ $b^2$ of the shear are mounted, the former fixedly thereon, and the latter carried by the reciprocating cross head $b^3$ which slides in suitable guides or ways $b^4$ on the swinging shear frame B. The reciprocating cross head $b^3$ which carries the movable or reciprocating cutter or shear has a trunnion or pivot $b^5$ pivotally connecting it to the swinging links C which are pivotally connected to the main frame A at $C^1$, and also for pivotally connecting it with the stem $d$ of the operating piston D of the cylinder F.

E is the spring which acts against the swinging shear-frame B to restore it to position. It surrounds a guide rod $E^1$ attached to the main frame A, and acts against a movable cap $E^2$, which is connected by links $E^3$ with the swinging shear frame B.

The operating cylinder F is furnished at its upper end with an inlet port $f$ for the steam or operative fluid under pressure employed for actuating the shear, and with an exhaust port $f^1$ near its lower end which communicates with the exhaust port $g$ in the casing or shell G of the exhaust or release valve $G^1$. The operating cylinder F is also provided with a by-pass $f^2$ leading from the upper middle portion of the cylinder to near the lower end thereof, as will be readily understood from Figs. 1 and 4, so that after the piston has moved on its down stroke sufficiently to cause the shear to completely sever the rod or bar, the steam or other fluid under pressure may then quickly flow to the other side of the piston and thus cushion and arrest its further downward movement and prevent hammering, and also cause the fluid pressure to be equalized or balanced on the opposite sides of the piston, and thus enable the shear frame spring E to automatically return or store the swinging shear frame B to position for the next successive stroke or operation.

The exhaust or release valve $G^1$, or its stem $g^1$, is furnished with a hand-operated lever $g^2$ by which the valve is positively moved to open the exhaust and thus set the shear in operation. This hand-operated lever $g^2$ is provided with a spring $g^3$ by which the valve is automatically and quickly returned to position to close the exhaust. To positively limit the opening movement of the valve an adjustable stop $g^4$ is provided, the same consisting preferably of a screw furnished with nuts $g^5 g^5$.

The operation is as follows: The rod X is continuously fed or advanced by the feed rolls $A^1$, and when the desired length of rod has been fed or advanced between the upper and lower cutters of the shear, the operator with his finger momentarily pulls back the hand lever $g^2$ of the exhaust valve $G^1$ against the stop $g^4$, and then releases the hand lever the instant the valve $g^1$ strikes the stop $g^4$, thus permitting the spring $g^3$ to at once again return the valve to its normal position and close the exhaust. During the short interval that the exhaust is thus opened the steam or other fluid pressure acting against the upper face of the piston causes the same to make a down stroke of sufficient length to operate the upper or reciprocating cutter of the shear and sever the rod. The moment the rod is thus severed the piston passes the upper end of the by-pass $f^2$, at which time the spring $g^3$ has closed the exhaust, and the steam or other operative fluid under pressure flows through the by-pass to the lower side of the piston, thus equalizing or balancing the pressure thereon, and then the shear frame spring E returns the swinging shear frame B to position for the next operation.

The hand lever $g^2$ is, ordinarily, not grasped directly by the hand, but by a hook or pull rod or wire which is held by the operator in his hand.

I claim:

1. In a swinging shear for rod or bar mills, the combination with the feed rolls, swinging shear frame, furnished with cutters, and a spring for returning the swinging shear frame to position, of an operating cylinder and piston, and an exhaust or release valve for setting the shear in operation, said cylinder being furnished with a by-pass to cushion and arrest the stroke of the piston after the shear has severed the rod or bar and to enable said shear frame spring to restore the swinging shear frame to position, substantially as specified.

2. In a swinging shear for rod or bar mills, the combination with the feed rolls, swinging shear frame, furnished with cutters, and a spring for returning the swinging shear frame to position, of an operating cylinder and piston, an exhaust or release valve for setting the shear in operation, said cylinder being furnished with a by-pass to cushion and arrest the stroke of the piston after the shear has severed the rod or bar and to enable said shear frame spring to restore the swinging shear frame to position, and a hand lever for operating said release valve, substantially as specified.

3. In a swinging shear for rod or bar mills, the combination with the feed rolls, swinging shear frame, furnished with cutters, and a spring for returning the swinging shear frame to position, of an operating cylinder and piston, an exhaust or release valve for setting the shear in operation, said cylinder being furnished with a by-pass to cushion and arrest the stroke of the piston after the shear has severed the rod or bar and to enable said shear frame spring to restore the swinging shear frame to position, a hand lever for operating said release valve, and a spring for closing the same, substantially as specified.

4. In a swinging shear for rod or bar mills, the combination with the feed rolls, swinging shear frame furnished with cutters and a spring for returning the swinging shear frame to position, of an operating cylinder and piston, an exhaust or release valve for setting the shear in operation, said cylinder being furnished with a by-pass to cushion and arrest the stroke of the piston after the shear has severed the rod or bar and to enable said shear frame spring to restore the swinging shear frame to position, a hand lever for operating said release valve, a spring for closing the same, and a stop for limiting the opening movement of the release valve, substantially as specified.

5. In a swinging shear for rod or bar mills, the combination with the feed rolls, swinging shear frame furnished with cutters and a spring for returning the swinging shear frame to position, of an operating cylinder and piston, an exhaust or release valve for setting the shear in operation, said cylinder being furnished with a by-pass to cushion and arrest the stroke of the piston after the shear has severed the rod or bar and to enable said shear frame spring to restore the swinging shear frame to position, a hand lever for operating said release valve, and an adjustable stop for limiting the opening movement of the release valve, substantially as specified.

6. In a swinging shear, the combination with the swinging shear frame and cutters thereon, of a spring for returning it to position, an operating cylinder and piston, an exhaust valve, a spring for closing and holding closed said valve, a stop for limiting the opening movement of said valve, and means for positively opening the valve, the automatic closing of said release valve by said spring cushioning the stroke of said piston, substantially as specified.

WILLIAM H. STANTON.

Witnesses:
WILLIAM A. GEIGER,
JOHN W. STANTON.